Nov. 28, 1967

W. H. MEYER ETAL 3,354,813

DISPENSING APPARATUS

Filed Oct. 15, 1965

INVENTORS.
WERNER MEYER
JAMES J. CURRY
BY

*Arthur J. Plantamura*
ATTORNEY.

INVENTORS.
WERNER MEYER
JAMES J. CURRY
BY
Arthur J. Plantamura
ATTORNEY.

Nov. 28, 1967  W. H. MEYER ETAL  3,354,813
DISPENSING APPARATUS
Filed Oct. 15, 1965  16 Sheets-Sheet 4
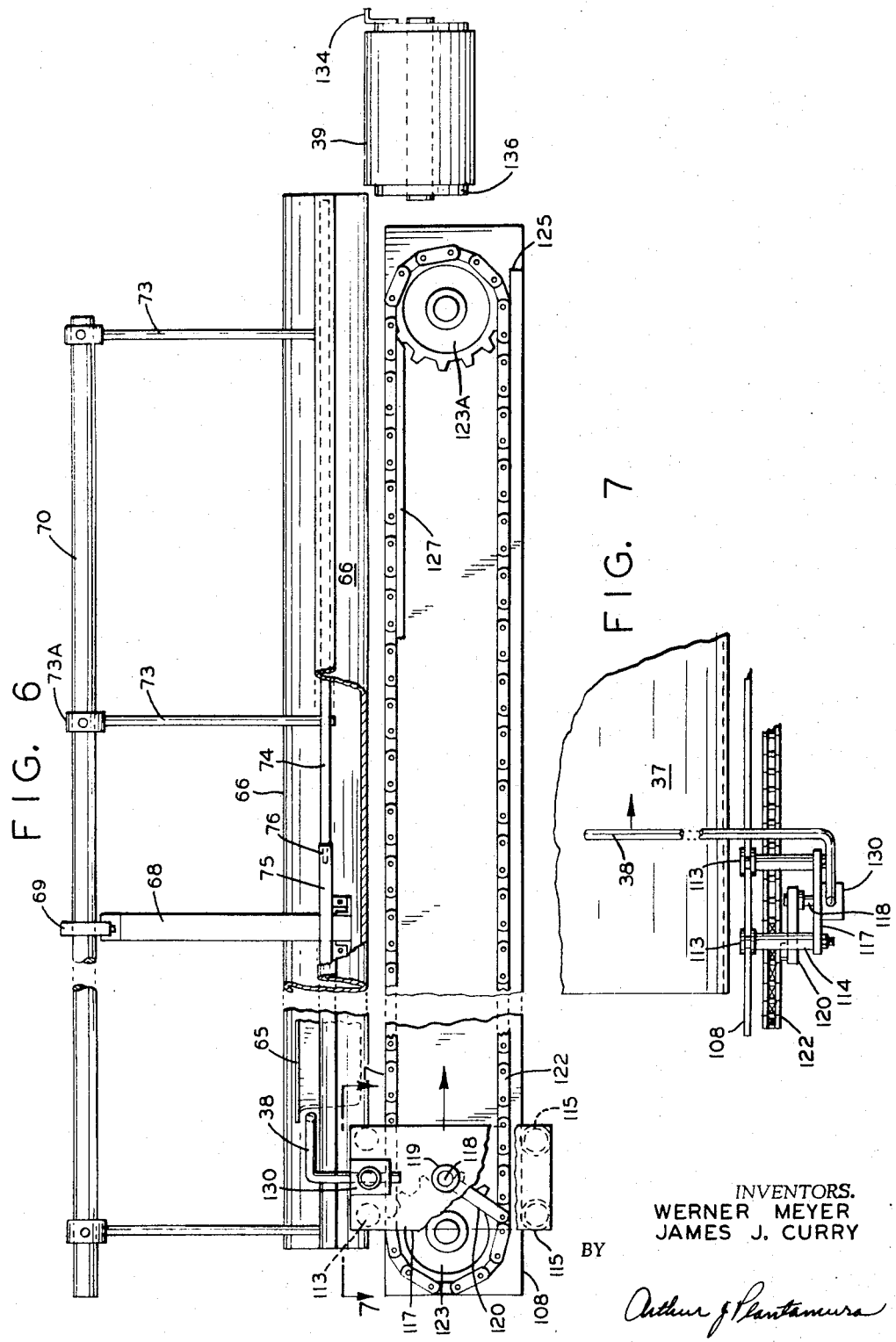
INVENTORS.
WERNER MEYER
JAMES J. CURRY
BY
Arthur J. Plantamura
ATTORNEY.

Nov. 28, 1967

W. H. MEYER ETAL 3,354,813

DISPENSING APPARATUS

Filed Oct. 15, 1965

INVENTORS.
WERNER MEYER
JAMES J. CURRY

BY *Arthur J. Plantamura*

ATTORNEY.

Nov. 28, 1967  W. H. MEYER ETAL  3,354,813
DISPENSING APPARATUS
Filed Oct. 15, 1965  16 Sheets-Sheet 6
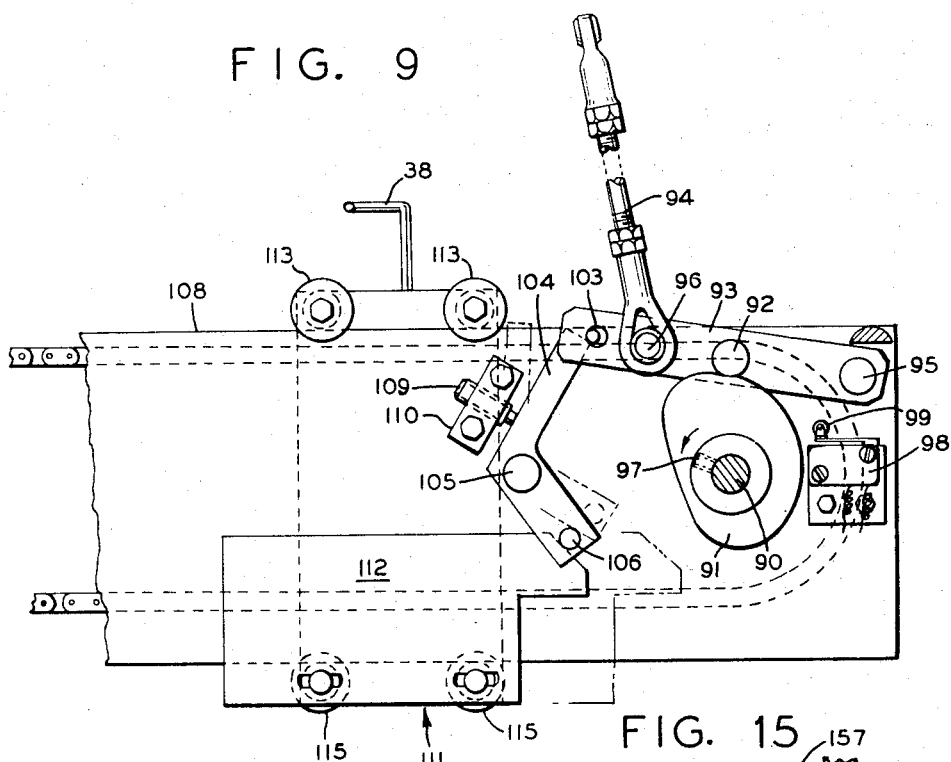
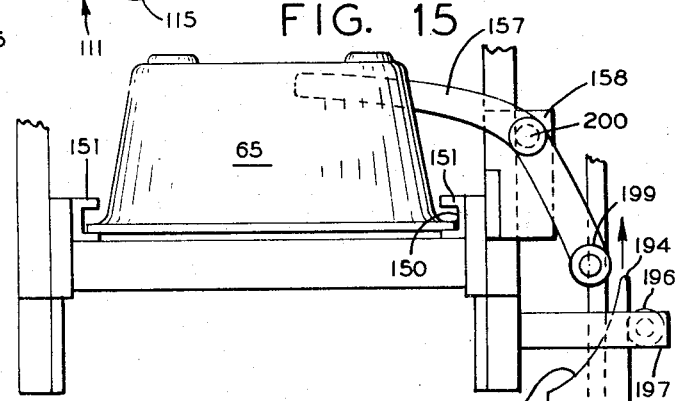
INVENTORS.
WERNER MEYER
JAMES J. CURRY
BY
ATTORNEY.

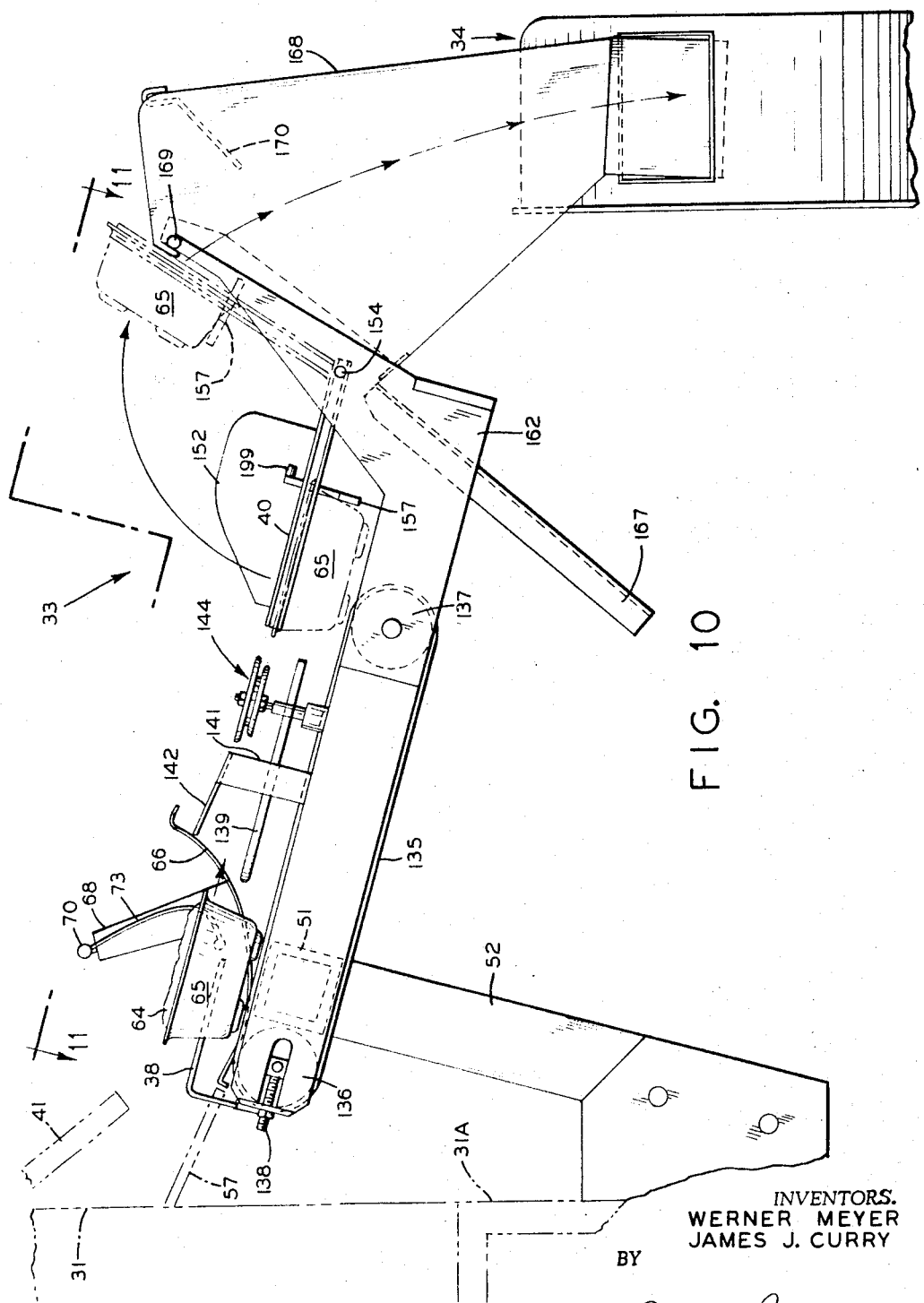

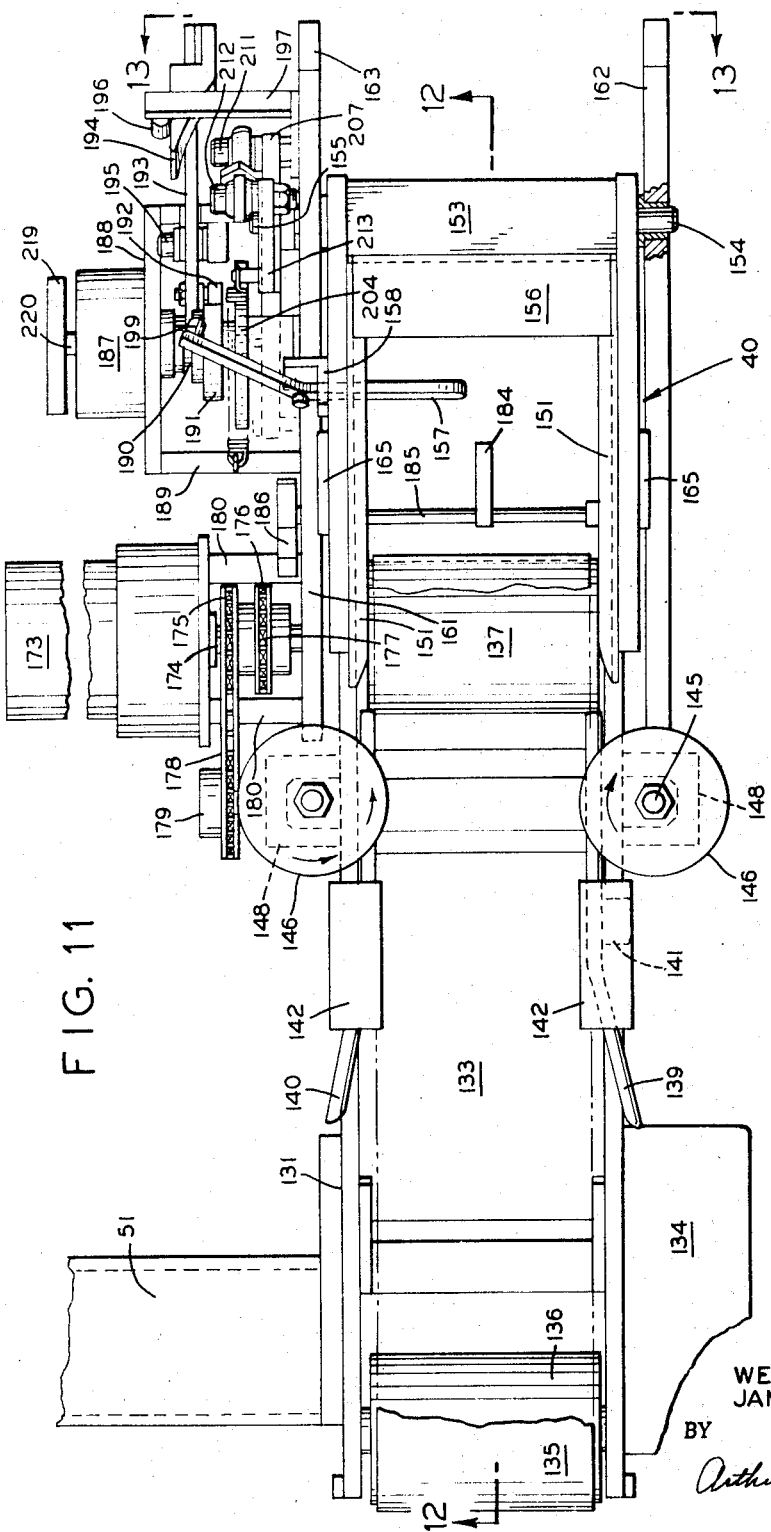

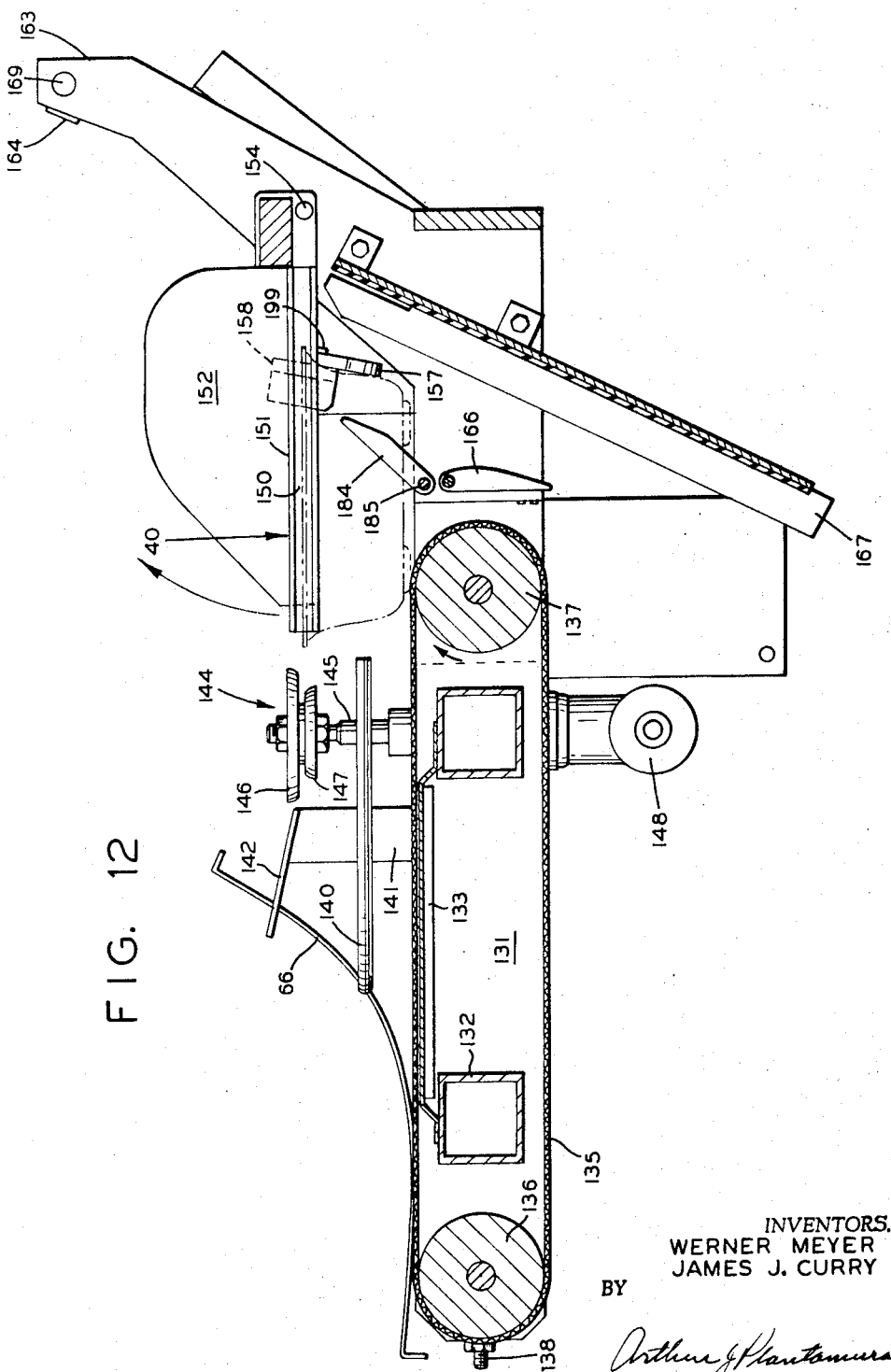

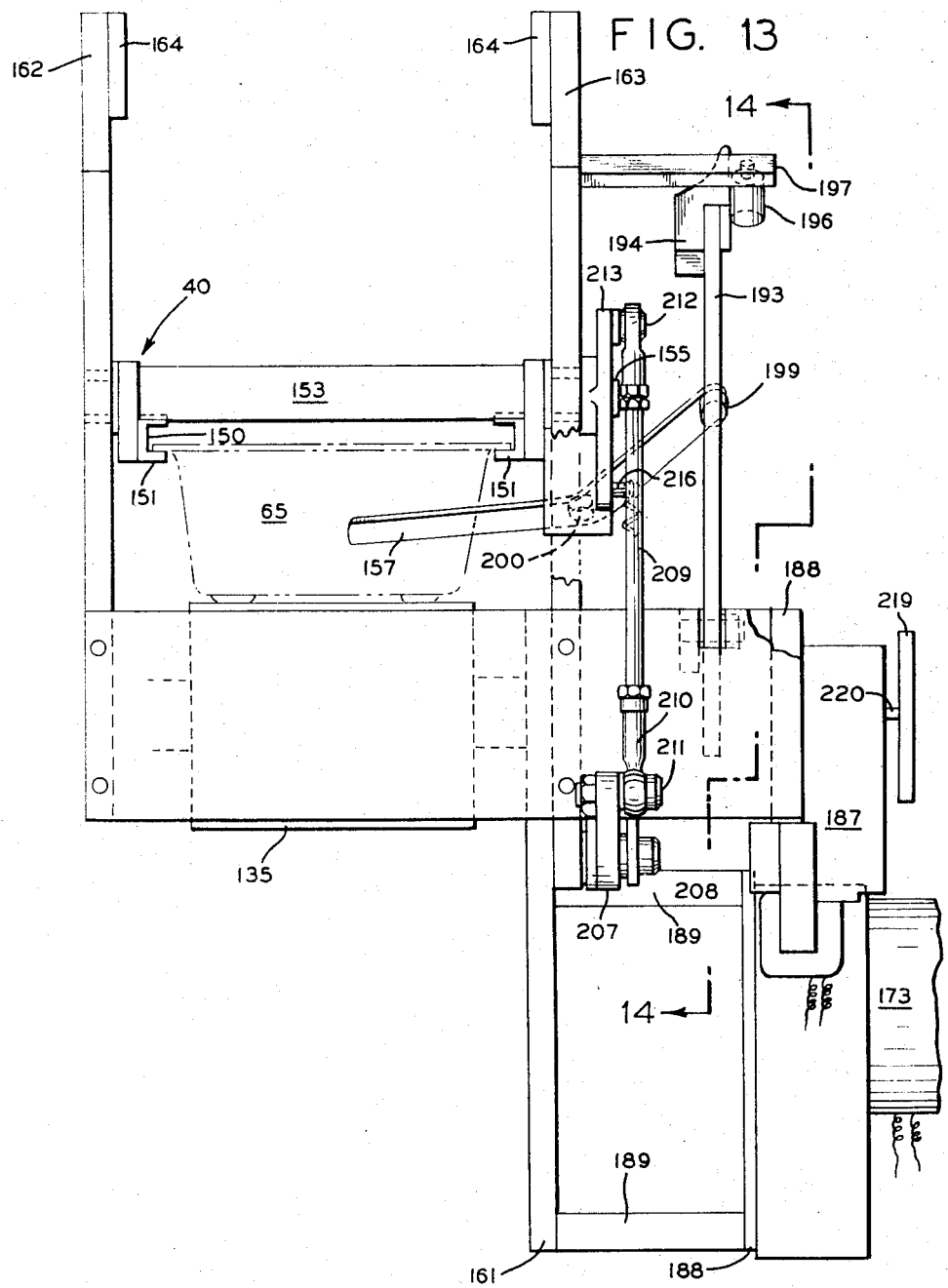

INVENTORS.
WERNER MEYER
JAMES J. CURRY
BY Arthur J. Plantamura
ATTORNEY.

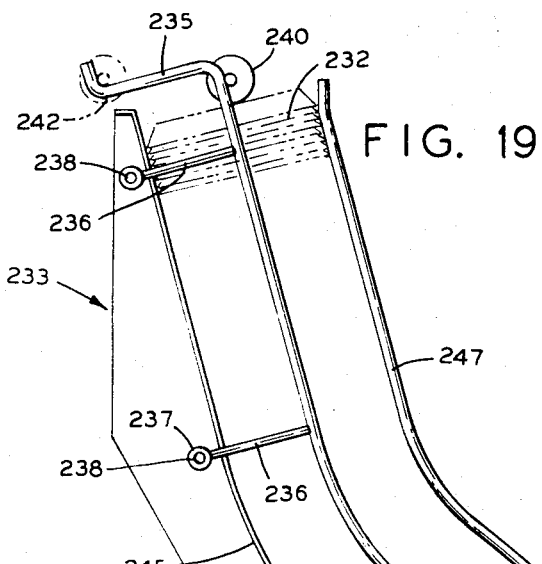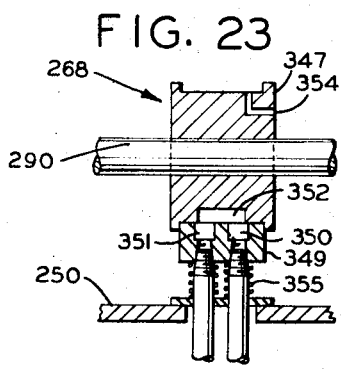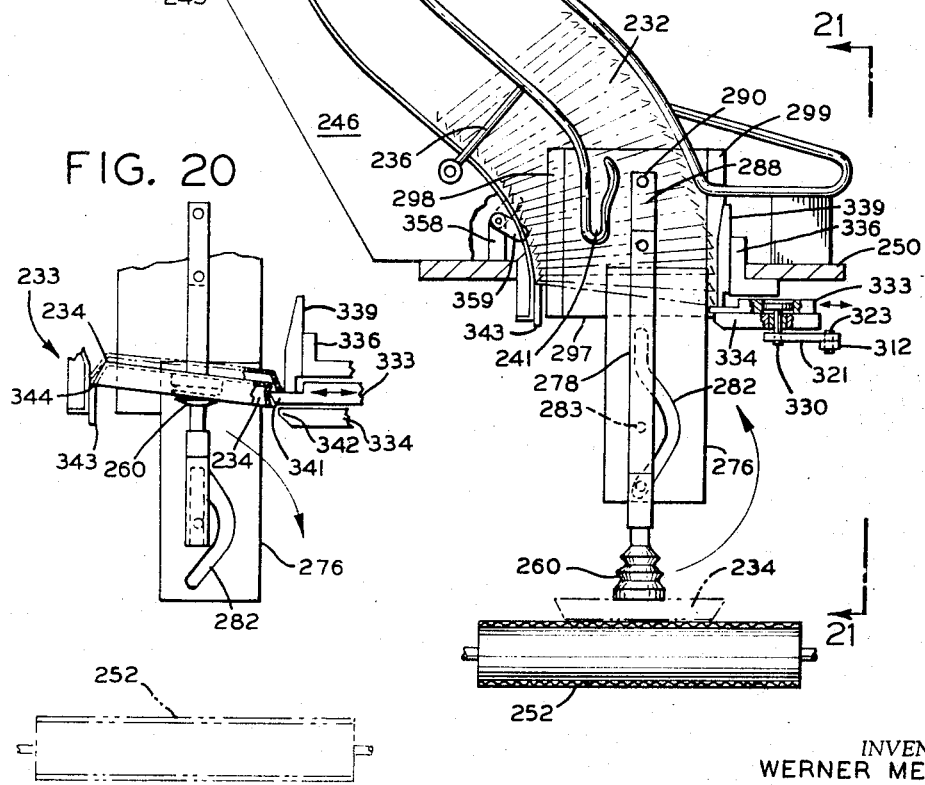

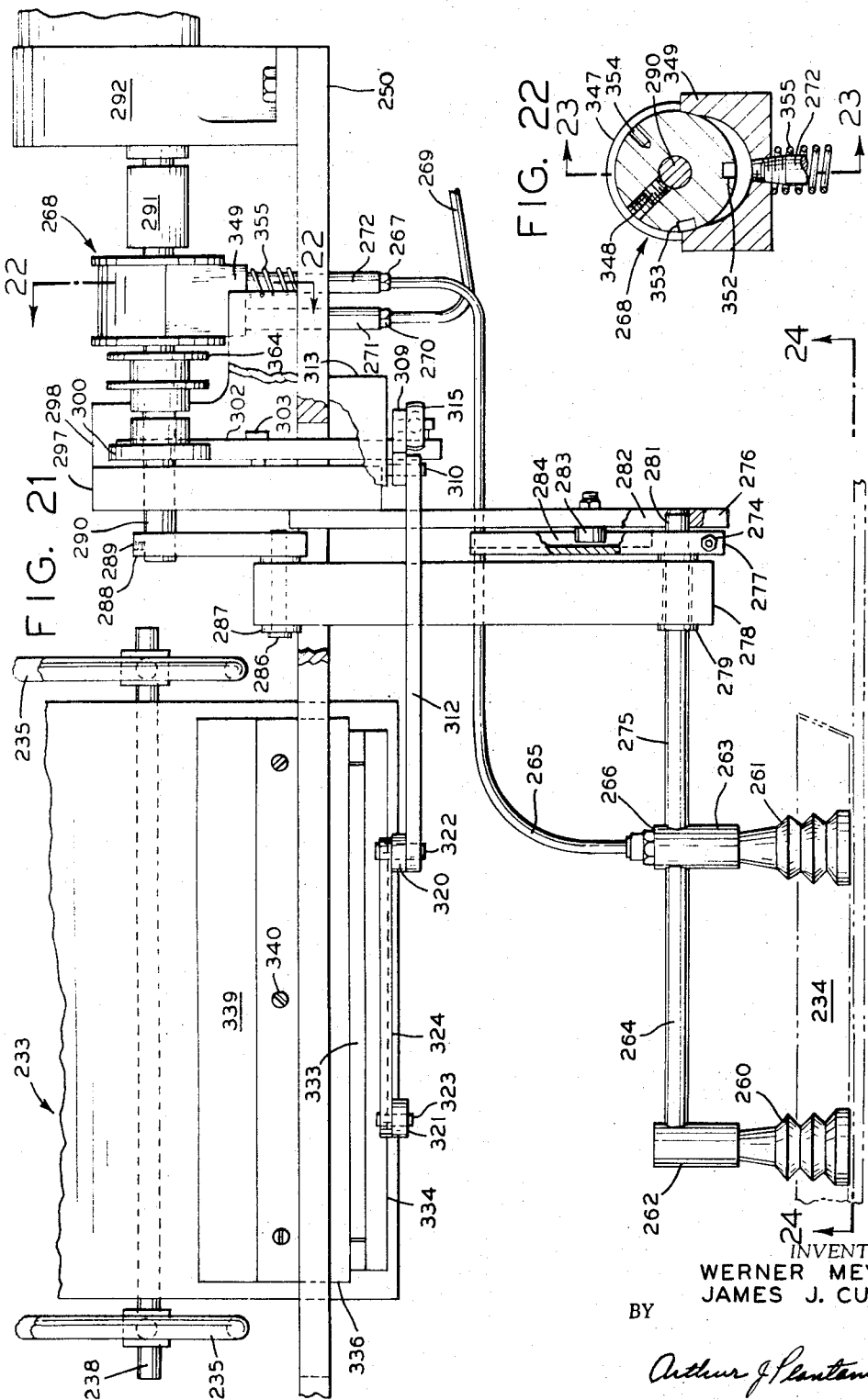

Nov. 28, 1967  W. H. MEYER ETAL  3,354,813
DISPENSING APPARATUS
Filed Oct. 15, 1965  16 Sheets-Sheet 15
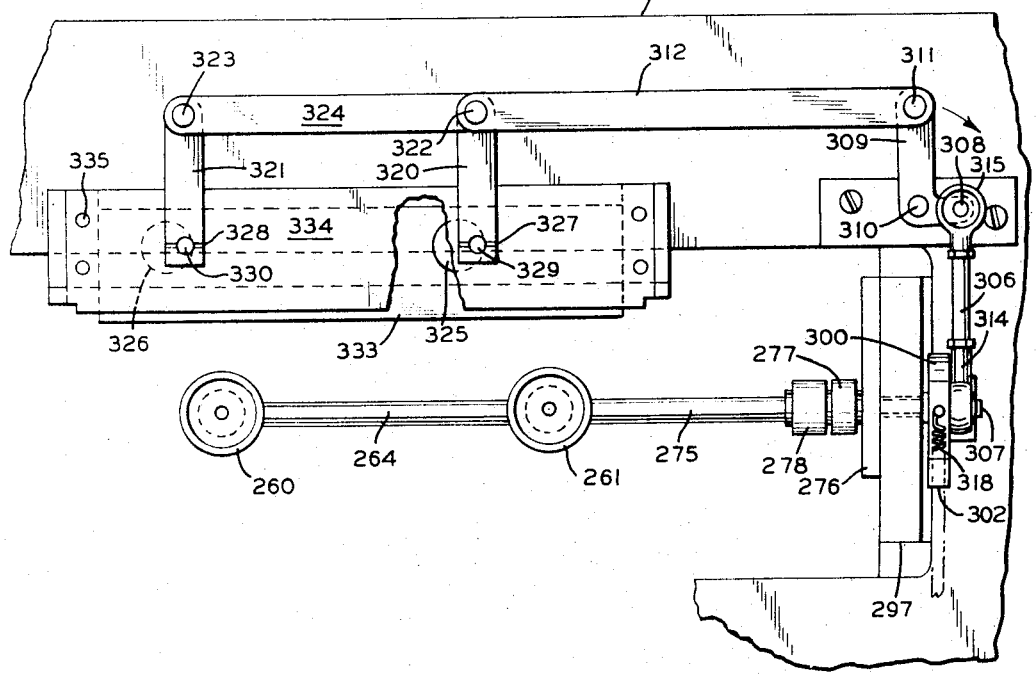
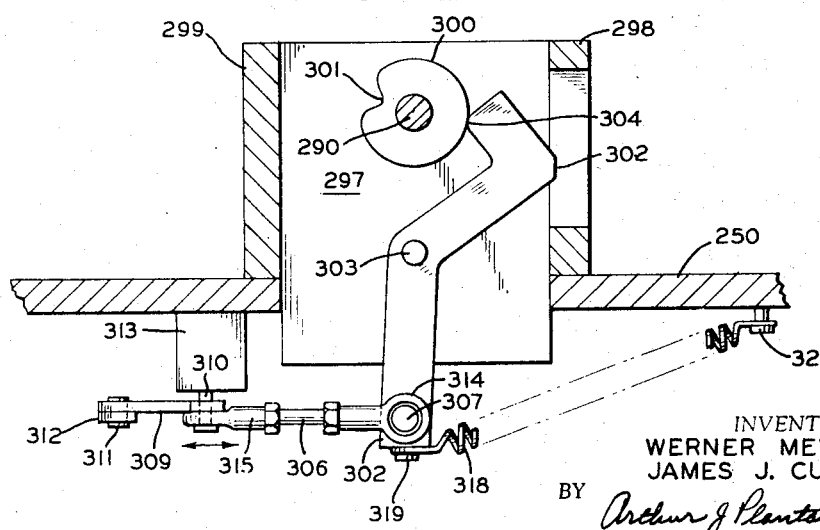
INVENTORS.
WERNER MEYER
JAMES J. CURRY
BY *Arthur J Plantamura*
ATTORNEY.

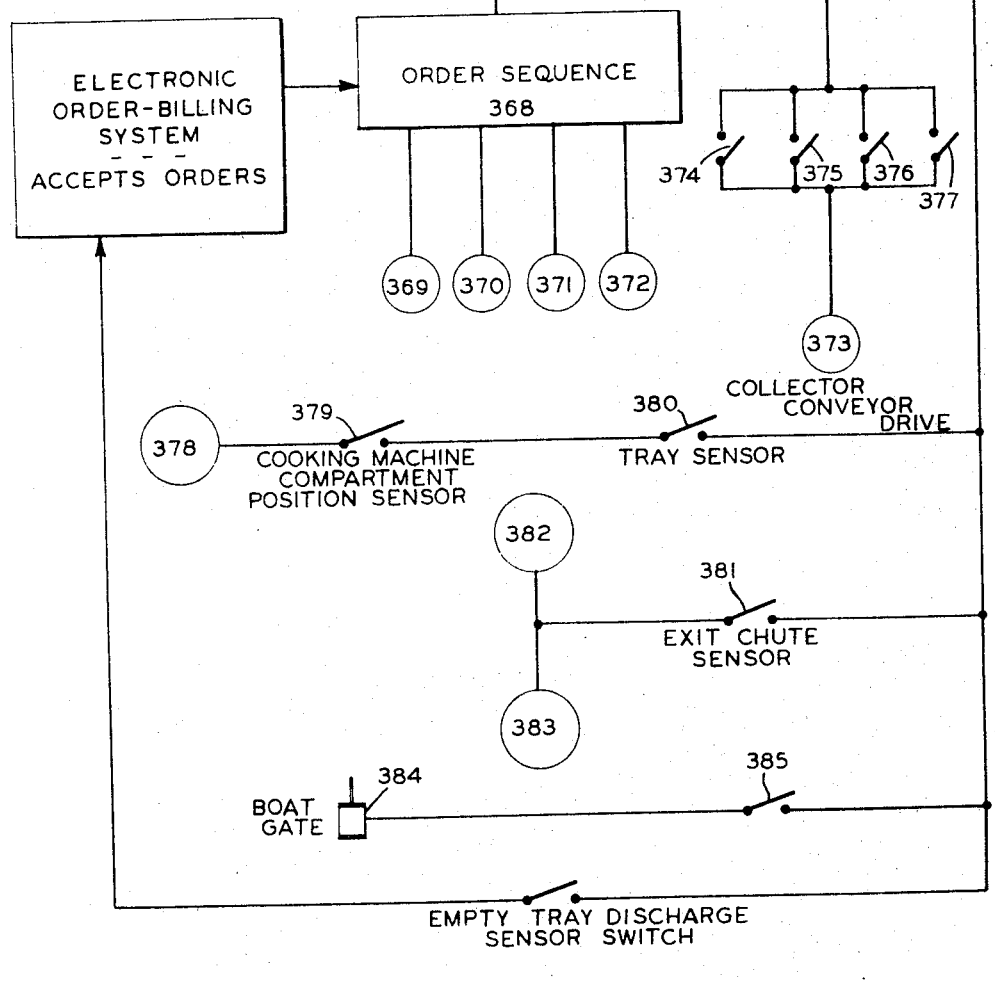

United States Patent Office 3,354,813
Patented Nov. 28, 1967

3,354,813
DISPENSING APPARATUS
Werner Herman Meyer, Northvale, N.J., and James J. Curry, New Canaan, Conn., assignors to American Machine & Foundry Company, a corporation of New Jersey
Filed Oct. 15, 1965, Ser. No. 496,491
5 Claims. (Cl. 99—336)

ABSTRACT OF THE DISCLOSURE

A container dispensing unit including a frame, a storage chute, a pair of stationary support ledges, a reciprocating blade, a vacuum cup, means to reciprocate said blade, and means to provide vacuum to said vacuum cup.

---

This invention resides in improved machinery for automatically dispensing and delivering a variety of food products such as chicken, shrimp, french fried potatoes, onion rings, etc. to a cooking machine. In a more specific embodiment, the invention relates to an apparatus which may be incorporated into an automated system for dispensing any of a variety of foods in trays from storage to a cooking machine from whence the cooked food is deposited into an automatically dispensed single use container ready for delivery to a customer.

The machinery of the invention is admirably adaptable to be included with other apparatus in remotely actuated system having a plurality of food preparing apparatus. Systems of the kind contemplated comprise a centrally located attended control station where orders for food items are received from customers either directly at a control station, or by telephone from dining areas, or by other voice communication such as from microphones in drive-in parking lots, and where through electronic ordering and billing equipment a plurality of different food preparation machines are commanded to simultaneously or individually cook and dispense food items.

The material processing apparatus of the invention is characterized by its reliable on-demand capability. It is independently operable as distinguished from continuous production units so that even though one or more hours may have elapsed since a prior item was dispensed, upon demand it functions rapidly and dependably to dispense a single, or an indefinite sequence of items. Moreover, the machine of the invention differs from machines of the prior art, such as those normally referred to as vending machines, in that it is capable of accepting and processing (simultaneous) orders while still processing a previous order. A further characteristic resides in the control feature of a sequence of operations all of which may be appropriately triggered from a single electrical impulse which in turn through its inherent mechanism synchronously triggers later functions to provide a complete operation from dispensing food in a tray from storage, dumping it into a cooking apparatus and thereafter depositing the cooked food into a single use container for delivery to customers.

It is an object of the invention to provide an improved receptacle dispensing unit having novel features and excellent reliability.

It is another object of the present invention to provide in combination a novel machine for delivering to and receiving food items in individual single use serving containers, from a cooking apparatus or other processing machine.

It is another object of the invention to provide a novel system which includes, in combination, mechanism for receiving items in trays or containers and delivering them to a cooking unit, and redepositing the items after cooking into a container for delivery to a customer.

It is a still further and more particular object of the invention to provide a self-contained automatic machine of this kind which may be readily incorporated in an electronic ordering and billing system so that upon remote command the machine is fed individual items for cooking and then after cooking is received into an automatically presented receptacle for the food wherein it is carried to a central assembly station for serving to a customer.

The above and other objects, features, and advantages of the invention will be better understood from the following detailed description thereof when it is considered in conjunction with the accompanying drawing in which:

FIG. 6 is an elevational view taken along line 6—6 of FIG. 2 showing the tray collector arm.

FIG. 7 is a detail view of the tray collector pusher taken along line 7—7 of FIG. 6

FIG. 9 is an elevational view along line 9—9 of FIG. 8 showing the linkage and cam for actuating the swing bar.

FIG. 10 is a side view taken substantially along line 10—10 of FIG. 2 showing the path a loaded tray would take as it is guided into the cooking apparatus.

FIG. 11 is a plan view taken substantially along line 11—11 of FIG. 10.

FIG. 12 is a sectional view in elevation taken substantially along line 12—12 of FIG. 11.

FIG. 13 is a view taken substantially along line 13—13 of FIG. 11.

FIG. 15 is a plan view showing the tray stop with tray in position for dumping the food.

FIG. 16 is a similar view showing the tray stop cammed out of the way to permit the empty tray to slide out of the dumper fork.

FIG. 19 is an elevational view partially in section of the boat dispenser illustrating the contoured storage magazine which flexes the stack of boats as they are fed and the escapement feed mechanism therefore.

FIG. 20 is a sectional view taken along line 20—20 of FIG. 18.

FIG. 21 is a side elevational view taken substantially along line 21—21 of FIG. 19.

FIG. 22 is an elevational sectional view of the rotary air valve taken substantially along line 22—22 of FIG. 21.

FIG. 23 is another sectional view of the rotary air valve taken substantially along line 23—23 of FIG. 22.

FIG. 24 is a bottom view taken along line 24—24 of FIG. 21 showing the linkages for operation of the stacked boat escapement mechanism.

FIG. 25 is a detailed view of the cam and pawl arrangement for the operation of the linkages of the escapement mechanism of FIG. 24.

FIG. 26 is a schematic wiring diagram depicting generally the electrical interconnection of the apparatus of FIGS. 2–26.

In general, the novel apparatus of the invention includes the capability of receiving items stored in trays or other receptacles and delivering them to, and dumping them into, a cooking apparatus; and following the cooking cycle, dispensing the product into a paper container or dish in which delivery is made to the customer.

More specifically, the apparatus of the invention has the following automatic capabilities: (a) upon demand to receive from storage at a plurality of stations items in containers, (b) collecting the containers, delivering them to, and emptying the contents thereof into, a single processing unit, and (c) to receive processed material in a receptacle which is automatically dispensed and positioned at the exit station of said processing unit for receiving processed material and to deliver said material in the receptacle to a receiving station or take away conveyor. Additionally, this apparatus may be equipped to be keyed into to form a part of a system with other machines wherein the machines are remotely actuated electronically, with other automatic food and beverage preparation machines in controlled sequence, to provide automatically a full menu of items as illustrated, for example, in FIG. 1.

Figure 1:
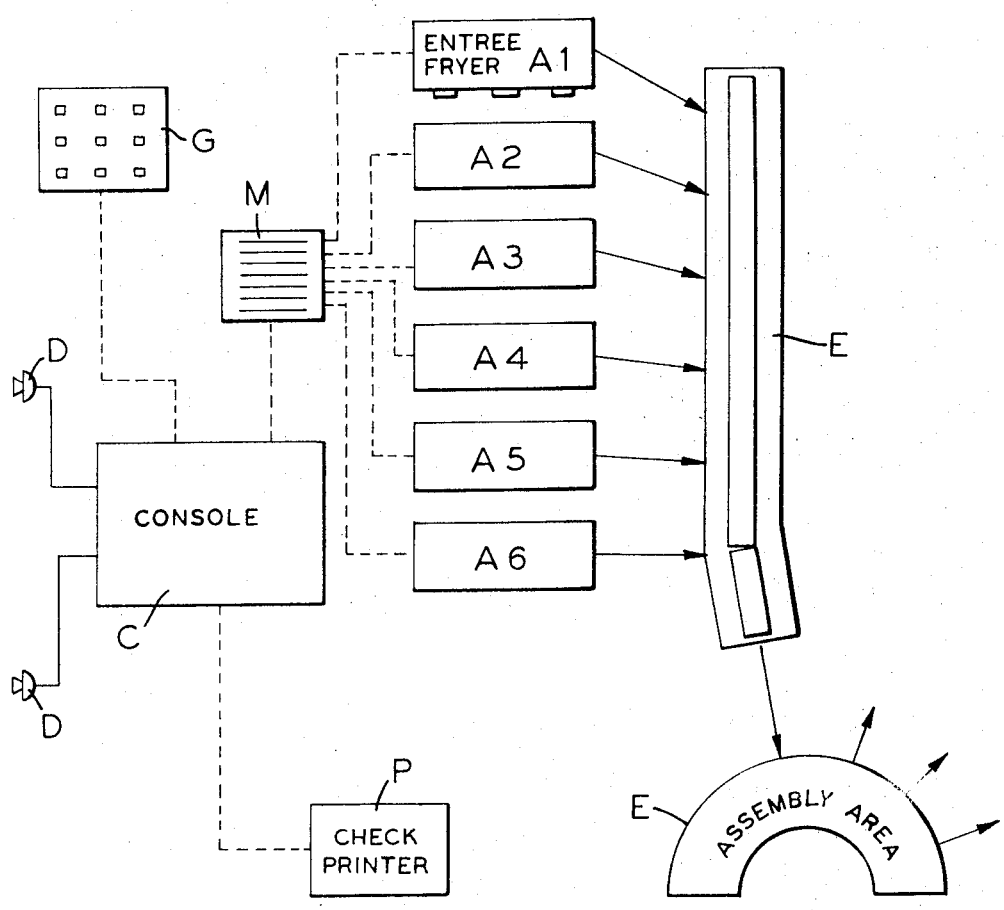
FIG. 1 is a schematic diagram of an automated system which includes the machine described hereafter in greater detail for receiving and, after processing, for dispensing ready to eat items wherein a control station provides the source for initiating (through an electrical system) the preparation and delivery to an assembly area, wholly automatically, of a plurality of food items.

In the diagram of FIG. 1, the machine to which the present invention is directed, is designated A1 and is shown in conjunction with two other machines A2 and A3, examples of which may be, for example, those described in the pending United States patent applications (a) of Udall et al. Ser. No. 220,615, "Food Preparing Apparatus and Method" now U.S. Patent No. 3,266,442, issued August 16, 1966, and (b) Gassman Ser. No. 445,921, "Automatic Cooking Machine." Generally, the system functions as follows:

Orders from outside sources such as a dining room D and an outside drive-in parking lot O, are received by an attendant generally through remote voice communication at console C. The attendant enters the order into the consoles and thereby actuates the printer P which prints out a check. The printer is conveniently situated contiguous to the assembly area E. The electronic console C simultaneously enters the food orders into that part of the memory device M for the appropriate machines A1, A2, and A3, etc. The memory unit M serves to rapidly accept and store or backlog a quantity of orders and to feed the orders individually into the machines when the machines is capable of accepting an order, i.e. after an item previously ordered is in process. As the order is accepted by the machines A1, A2, etc. the backlog stored in the memory is reduced by that item accepted and in process.

A bank of electric order counters G records and provides a readout of the number of orders passing through each machine to aid in inventory and machine replenishment schedules. The order and billing system likewise totals the amount of billings.

After the order processed by the machine is delivered to the assembly area and assembled with its corresponding printed check, it is delivered by an attendant to the ordering customer. Details of a suitable electronic ordering and billing system useful in conjunction with the invention are described in the pending U.S. Patent Application of N. Alpert et al., Ser. No. 219,222, entitled "Electronic Ordering, Price Computing and Billing System," now U.S. Patent No. 3,267,436, issued August 16, 1966.

The apparatus of the invention is arranged to function in conjunction with a plurality of compartments which store items in trays i.e. entree foods and from which it is desired to deliver the food to a single cooking machine. As the exit door of a storage compartment opens, a transition plate is aligned with the exit chute of the refrigerated compartment. The transition plate is arranged so as to effect a smooth transfer of the stored tray from the dispenser to a collector platform. When the tray comes to rest on the collector platform a bar or rail aligns the tray with a tray pusher which transports the tray to the dump conveyor.

After the tray is carried onto a dump conveyor, conveyor guides and tray-edge rollers position the tray in the dumper fork or arms. The dump mechanism inverts the tray and deposits the contents into a cooking machine inlet chute. The empty entree tray is then released into an empty tray chute and the dump arms return to await the next tray. The cooking machine to which the food is delivered is preferably of the type which can process a plurality of orders simultaneously. As such, for example, the individual serving compartmented apparatus, described in the copending application of H. C. Congelli et al., entitled Automated Flyer, Ser. No. 492,742, filed Oct. 1, 1965. That unit involves a compartmented wheel-like assembly mounted on a horizontal axis and contains a plurality of radially disposed separate cooking compartments approximately one-half of which are submerged in the cooking liquid during the cooking cycle. A loading chute is provided in the top of a stationary housing leading to the rotatable wheel to allow the food portion to enter an aligned receiving compartment and an exit chute is provided in the inside band forming the innermost wall of the cooking machine compartments to permit the cooked portion to slide out the bottom of the compartment scheduled to be vacated after approximately one revolution of the compartmented wheel-like element. This element, provided with intermittent movement, indexes continuously and receives its motion through a suitable drive mechanism.

The paper boat or receptacle which receives the cooked portion from the cooking machine is automatically positioned at a station near to, and for the purpose of accepting cooked food from, the cooking machine. For example, as will hereinafter be described the paper boat may be arranged to idle on a continuously moving take-away conveyor awaiting introduction therein of a cooked serving of food by utilizing a solenoid operated boat gate or barrier to restrain the receptacle from moving from the receiving station until it receives an order. As a cooked portion is loaded therein, the receptacle marking time on the moving conveyor is released by the gate, is carried away on the conveyor and is replaced by another empty boat from a dispenser which holds a supply stack of inverted paper boats or receptacles. The dispenser comprises an arrangement wherein the lowest boat is removed from an inverted stack by means of vacuum cups which inverts the boat being fed as the rest of the stack is supported by an escapement mechanism. Vacuum is shut off at the appropriate time to release the boat and permit it to drop onto, and if desired to be carried away on, a conveyor belt.

Figure 2:
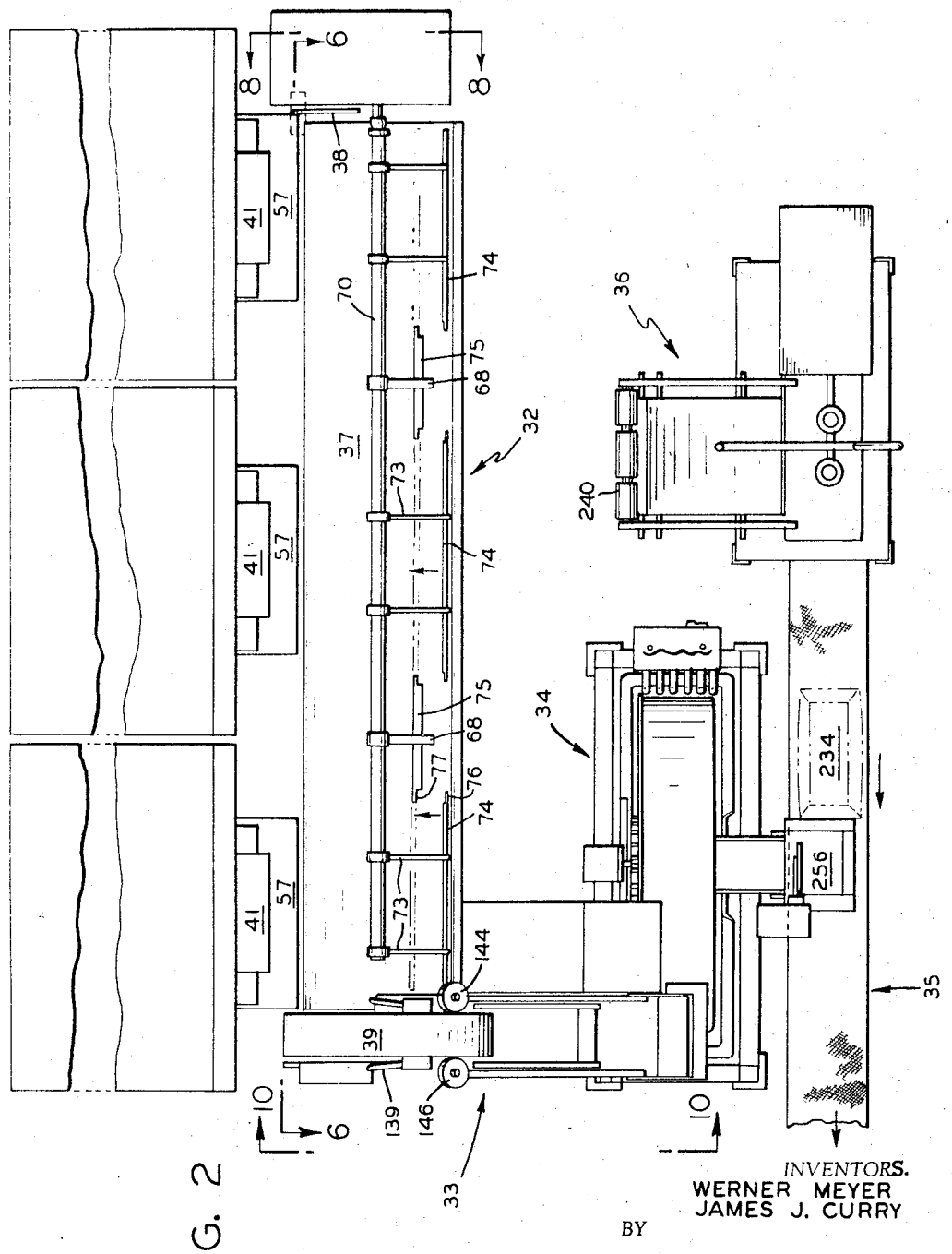
FIG. 2 is a plan view showing the major components of the system which stores, dispenses into cooking apparatus, and deposits the cooked material into a container automatically furnished at the cooking apparatus.

Referring to FIG. 2 a system layout is illustrated which comprises a plurality of refrigerators 31, three of which are shown. It will be apparent that any number refrigerators or other dispensing apparatus at various spaced locations may be employed. The refrigerators 31 are arranged generally to dispense food in open trays at separate locations onto a tray collector 32, which, it is seen, is adapted to receive items dispensed thereon at an indefinite number of stations and to carry them to a single processing unit 34 through the dumper mechanism 33. The dumper mechanism 33 inverts the tray and deposits the food received from many of the various dispensing locations into a single cooking machine 34. After an appropriate cooking time, the food is deposited into a suitable receptacle, e.g. a paper container or boat 234 furnished by the dispensing apparatus 36. Thereafter the food in the container 234 is either picked up at station 256 or carried away in a suitable manner such as on a conveyor arrangement 35.

Figure 4:
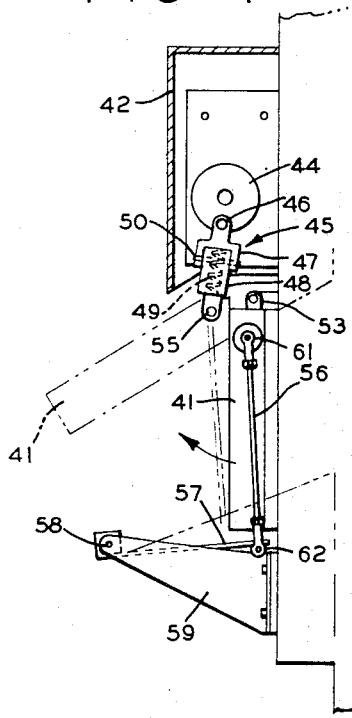
FIG. 4 illustrates in side elevation the door opened and the transition plate contiguous to the storage compartment door to provide a smooth delivery for trays dispensed from the storage compartment to the collector.
Figure 5:
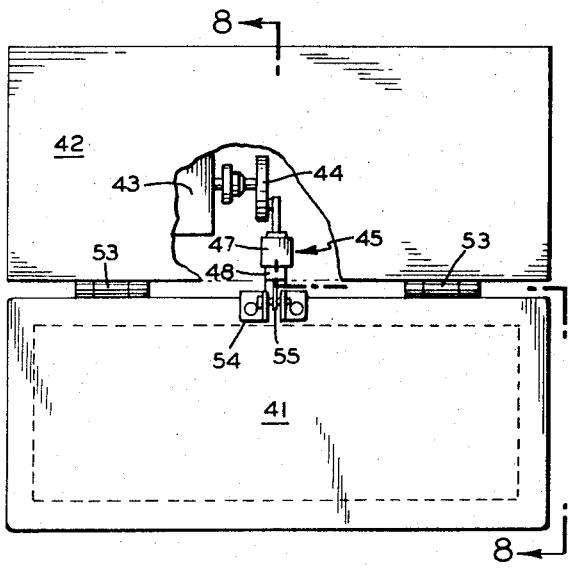
FIG. 5 is a front elevation of the door and transition plate arrangement referred to in FIG. 4.

Referring to FIGS. 4 and 5, the detail of the refrigerator exit door is shown. Upon an appropriate electrical signal such as would be received from the ordering-billing system of the kind referred to above in application Ser. No. 219,222, a stored tray containing food is dispensed from the door 41 which is suitably hinged at 53. A protective cover 42 may be employed for the door opening mechanism which includes a motor 43, crank 44 and a spring link mechanism 45. The spring link includes an inner housing 48 and outer housing 47 held together by dowel 50 and contains a spring 49 under compression which functions to applying pressure on the door to provide a positive seal. The mechanism 45 is pivotally connected at 46 to a crank on the shaft of a motor (which in turn is fixed to the refrigerator structure) and on the door bracket or adapter 54 at 55.

During the opening cycle of the door, a transition plate 57 connected at 62 to rod 56 (which is attached to the door at 61) is elevated to provide a ramp for trays dispensed from compartment 31 to slide out rather smoothly, i.e. to avoid capsizing or spillage. The transition plate 57 is fastened on one end to bracket 59 at the fixed pivot 58 and at the other end to the movable pivot 62. When the motor 43 is energized, the crank 44 makes one half of one revolution and carries the pivot point 46 to the top thereby pivoting the door open on hinges 53. The transition plate 57 is thereby elevated through the rod 56 to align itself with the bottom of the opening in the refrigerator 31, affording a smooth transition for trays being dispensed onto the collector mechanism 32. Dispensing storage compartments or refrigerators of the kind which may advantageously be adapted in conjunction with present invention are the kind disclosed, for example, in the U.S. pending application of Bardy et al., Ser. No. 284,456, now U.S. Patent No. 3,237,804, issued Mar. 1, 1966.

Figure 3:
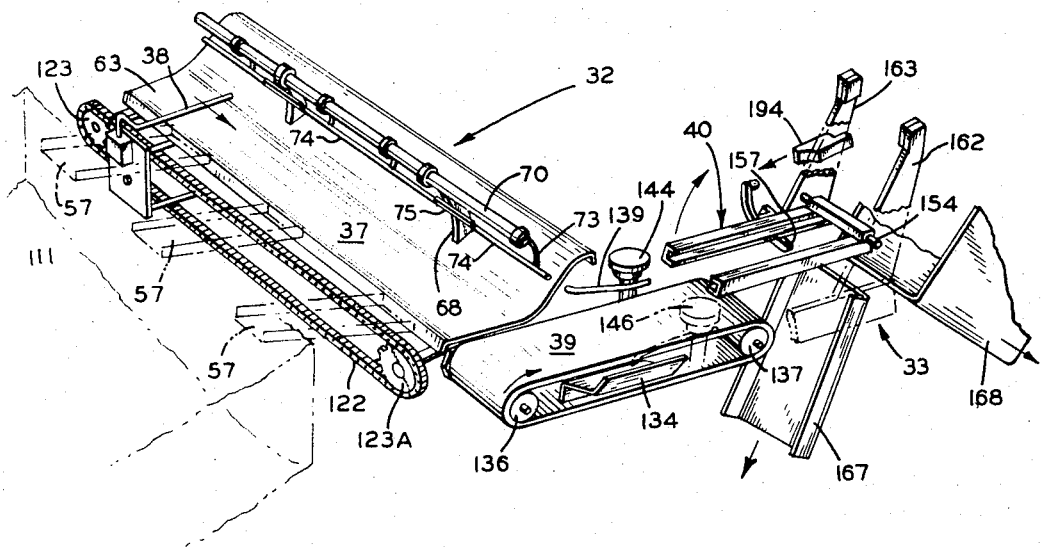
FIG. 3 is a perspective view showing the collector section, for trays dispensed from storage, and the dumping mechanism.

Referring to FIG. 3, a perspective illustration of the collector arrangement of the invention upon which the trays may be dispensed from refrigerators 31 (via transition plates 57) at various points on the collector plate 37. The food containing trays 65 deposited on plate 37 are picked up at any indeterminate location on the collector surface 37. The trays are carried by the pusher element 38, which is at rest at the extreme end 63 of the collector plate 37 and sweeps the entire length thereof, and are deposited on the dumper feed conveyor 39. An orienting plate 134 serves to stop and to align the tray longitudinally with the dumper fork 40. The plate 134, the guides 139, and the tray alignment wheels 144, all aid in positioning the tray within the pivoting fork of dumper 40 which is designed to accept the trays fed thereto. The fork of the dumper 40 holding a filled tray is raised pivotally about shaft 154 until the tray is inverted causing the contents to drop out of the tray into chute 168. After the contents are thus removed from the tray and directed into machine 34 (FIG. 2), a stop 157 (see FIG. 15) which holds tray 65 from falling out of the side holding elements 151, is withdrawn causing the empty tray by force of gravity to drop out of the dumper fork through a tray chute 167 (FIGS. 3, 10) to a point (not shown) where it is appropriately stacked or collected.

Figure 8:
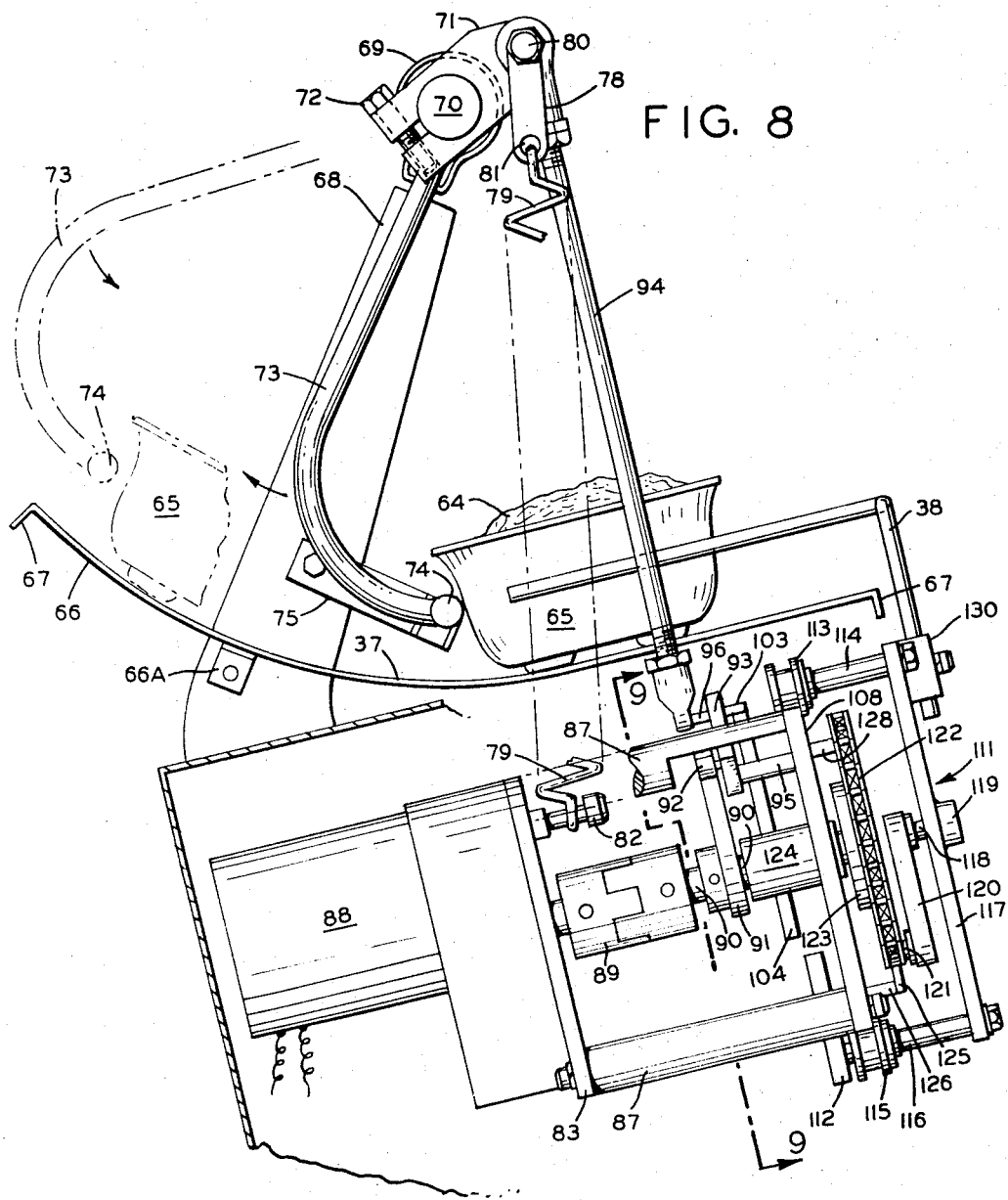
FIG. 8 is an end elevational view taken along line 8—8 of FIG. 2 illustrating the relationship of the tray collector pusher and swing bar.

Referring to FIGS. 6–9, the details of the food tray collector and means for delivery to the dumper conveyor are further illustrated and described. As the tray 65 is dispensed from the refrigerator 31 onto plate 57 it is arranged so that it slides onto the plate 37. The cross-sectional configuration of plate 37 is designed and arranged so that trays 65 dispensed with substantial momentum thereon will be slowed by gravity due to the elevated contour or rise 66 formed in the sheet metal collector 37. As viewed in FIG. 8, trays are dispensed onto plate 37 from right to left. Slowing of trays by gravity is preferable over means providing for more abrupt stopping, which would have a tendency to undesirably eject or spill food from the tray. Longitudinally extending flanges 67, at the edges of collector 37, provide rigidity to the sheet metal structure of collector 37. Collector plate 37 is suitably supported on a longitudinal mounting frame 51 attached by struts 52 to a refrigerator base 31A (see FIG. 10), and by brackets 66a (FIG. 8). To transport into alignment the trays 65 which may be carried by momentum up onto section 66a, a swing bar assembly 73 is actuated to adjust the position of the tray and align it with the stationary guide rails 75 which abut the path along the line of delivery to conveyor 39. It is seen that as rail 74 is actuated, it is aligned to form a continuous rail, with stationary members 75. To aid in the alignment of members 74 and 75, a stop pin 76 in member 74 may be arranged to mate with recess 77 formed in stationary rail 75. The swing bar assembly 73 is supported on a collar 73A from the swing bar 70 which in turn is supported by bearing 69 (FIG. 8). The bearing 69 is suitably supported on the rigid bearing support 68.

Actuation of the swing bar assembly is described in more detail by reference to FIGS. 8 and 9. As seen therein, drive motor 88 through coupling 89 connected to shaft 90 drives a designed cam 91. Rotation of the cam 91 actuates a swing bar actuator or link 93. The actuation 93 is through the cam follower 92 on the swing bar actuator 93 which is pivotally connected to plate 108 at the pivot point 95 and is arranged to oscillate as cam 91 rotates on shaft 90. This movement of actuator 93 is carried to the swing bar connecting rod 94 which is suitably pivotally connected to actuator 93 at 96. At the other end the connecting rod 94 is connected at 80 to the clamp crank 71 which is rigidly mounted on shaft 70. Shaft 70 carries and gives motion to the swing bar 73 which is suitably, clamped thereto. To return the swing bar assembly 73 to the waiting position shown in broken line in FIG. 8, a spring 79 is employed. Spring 79 is connected to the clamp 71 through the link 78 and at the other end, engages a fixed anchor screw 82. Lock latch 104 pivoted at 105 (FIG. 9), serves to hold the swing bar actuator 93 in the position (shown in solid lines in FIG. 8) during the interval while the carriage assembly 111 (to which is fixed the pusher 38) is traversing the length of collector plate 37 in the course of delivering or returning from delivering, a loaded tray to the dumper conveyor 39. After the carriage 111 has returned to the position shown in broken line in FIG. 9, the latch 104 is pivoted counter clockwise, unlatching the swing bar actuator 93 as the lock latch 104 is pivoted away from the pin 103. A spring loaded stop 109, held in bracket 110, serves to accurately and positively position the lock latch 104 while affording desired buffing action to promote proper functioning of engagement of elements 103 and 104.

Referring again to FIGS. 6–8, the drive for the carriage assembly 111 is provided by the motor 88. As shown in FIG. 8 the shaft 90 drives a sprocket 123 on which is mounted chain 122 which through drag link 120 serves as the drive for the carriage assembly 111 (see FIG. 6). The chain 122 which extends substantially the length of the collector 37 is mounted on the other end on idler sprocket 123A. The chain is supported by upper and lower chain guides 127 and 125, respectively, which are suitably spaced from the rail 108 by standoffs 126 and 128. The drag link 120 is connected to the chain 122 through a connecting pin 121 (see FIG. 8); the other end of the drag link 120 is connected at 118 to plate 117 of assembly 111. The assembly 111 as it traverses back and forth is supported on rail 108 by two pairs of flanged rollers, an upper set 113 and a lower set 115. The plate 117 which carries the pusher element 38 in support block 130, is mounted by means of studs 114 and 116 to the flanged rollers 113 and 115. Switch 98 and contact 99 therefor (FIG. 9) which is engaged by a swing bar actuator 93 functions to stop the motor 88 when the carriage 111 has returned to its rest position at which point swing bar assembly 73 is in its waiting position shown in broken line in FIG. 8. This switch also functions to prevent the dispensing of additional trays from the refrigerator while the carriage assembly 111 is in motion in either delivering, or returning from delivery of, a prior dispensed tray.

Following the delivery of the tray 65 onto the continuously running conveyor 39 by the pusher element 38, the trays are carried through guides 139 and 140 a height guide 142 and tray correcting wheels 144 which accurately deliver the edges of the tray into the fork mechanism 40 as seen more clearly in FIGS. 10–12. The conveyor 39 has a belt 135, which is appropriately mounted on drive roller 137 and idler roller 136 and is supported by the frame and support 131 and 132 respectively. A belt back-up plate 133 serves to maintain a measured distance from the base for the trays delivered to fork 40. Trays delivered by the pusher 38 onto the belt 135 are suitably oriented longitudinally by the orienting plate 134 before being carried through the guides 139 and the tray correcting wheels 144. The conveyor belt drive consists of motor 173 which is mounted on stand-offs 180 from a mounting plate 161. The motor shaft has two sprockets 175 and 176. Sprocket 175 drives the right angle gear boxes of the tray connecting wheels 144 through chains 178, and 179. The drive roller of the conveyor belt 135 is driven from sprocket 176 through chain 177.

Figure 14:
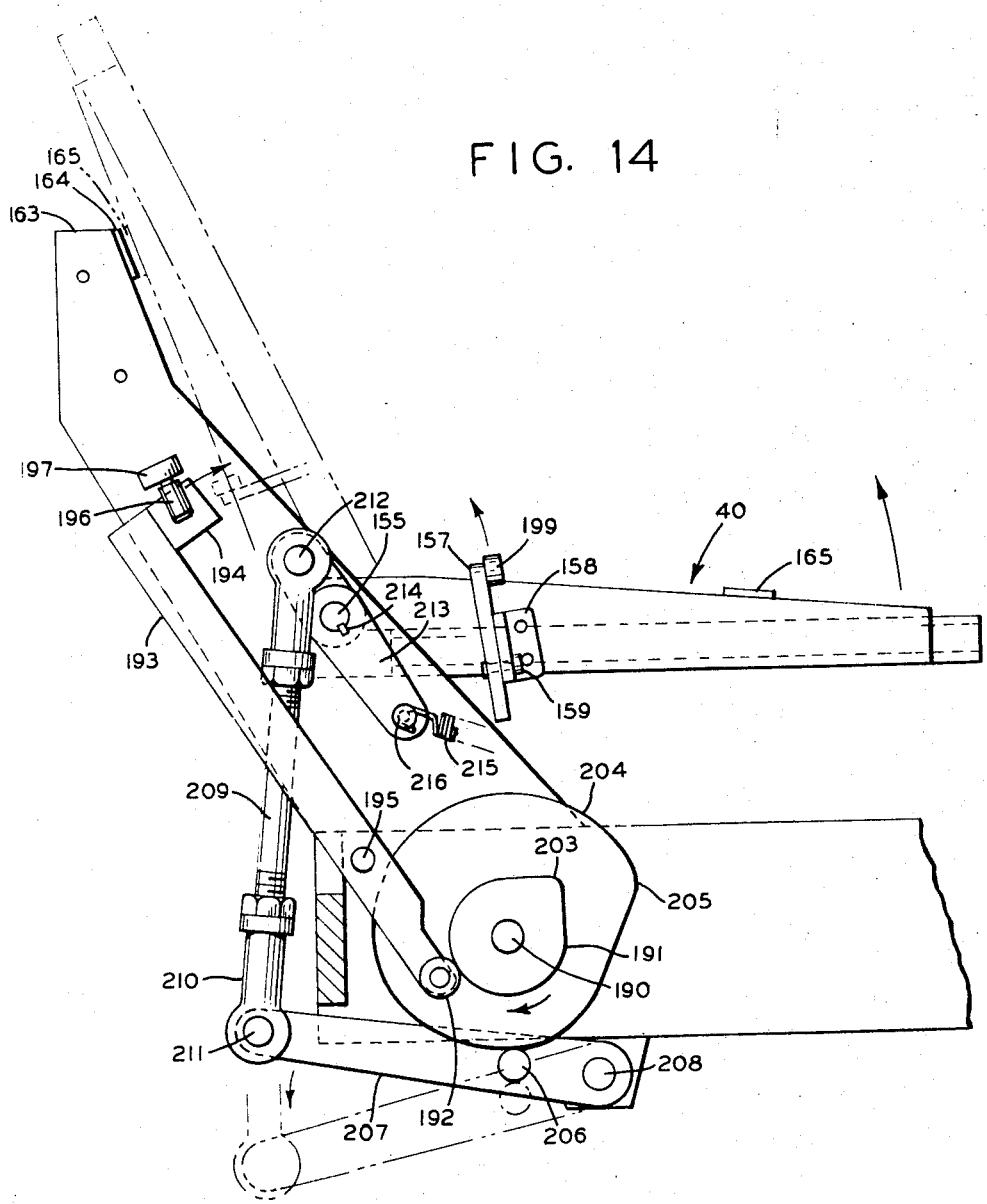
FIG. 14 is an elevational view taken along line 14—14 of FIG. 13 showing cams and linkages for the operation of the dumper fork, and the tray stop and release mechanism for the empty tray.

Positioned contiguous to the tray correcting wheels is a tray height guide 142 (see FIG. 12) mounted on supports 141 which functions to steer or guide the trays between the upper and lower wheels 146 and 147 of the tray correcting elements 144. Tray correcting wheels 144 (see FIG. 11) are arranged to rotate in opposite directions through suitable right angle gear box drives 148. Upper wheel 146 of the tray correcting driven elements not only aligns the tray for feeding to fork 40 but also clears the flange of the tray by forcing into the tray, overhanging food which would interfere with the entry of the edge of the tray into the channel of the fork 40. Additionally, the tray correcting wheels 144 also function to adjust the width of the tray and correct irregularities or distortions which may have occurred in the tray flanges such as through mishandling of the trays. The presence of a tray in fork 40 is sensed by an inner lock 184 pivotally mounted at 185 to contact the bottom of the tray (see FIG. 11). The fork 40 comprises a pair of spaced channel members 151 provided with a tray receiving channel 150. Members 151 which hold the tray are suitably mounted for pivotal movement at 154 on the top support arms 162 and 163. As the tray enters the channel 150 formed in arms 151 it is carried into abutment with a tray stop 157. Stop 157 is pivotally mounted on bracket 158 and prevents further travel of the tray into the fork and supports the tray against falling out i.e. against passing right through arms 151, as the fork is pivoted in the raised position during the dumping operation. The pivotal movement of the fork is better illustrated by reference to FIG. 14 which shows, in broken line, the dump position of the fork 40.

The presence of the tray in the arms 151 is sensed by means of a switch (not shown) actuated by element 184. In addition a switch mounted on the cooking machine 34 senses when a pocket is in the proper position to accept food. These two together, thus, prevent the dumping of food until there is a tray properly located in the dumper fork and also the cooking machine is in a position to accept a food portion; when in the ready position motor 187 is actuated to begin a dump cycle.

As the motor 187 drives the shaft 190, tray release cam 191 and tray dump cam 204 (see FIG. 14) fixed with respect to one another and on shaft 190 are driven clockwise. A link 207 pivoted at 208 carries a cam follower 206 which is actuated by the dump cycle cam 204 and in turn actuates connecting rod 209 which is pivotally connected thereto at 211 by a spherical connector 210. The opposite end of rod 209 is connected to a lever arm 213 at pivot 212. The lever arm 213 is keyed at 214 to the drive shaft 155 of the fork 40.

Return of the fork 40 (after a tray has been dumped) to the tray receiving position is effected by spring 215 connected at 216 to the lever arm 213. The opposite end of spring 215 is suitably anchored on the frame. The design of the cam 204 is such as to raise the arms 151 of fork 40 and carry them against the stops 163 with considerable force as the high point 205 on cam 204 reaches follower 206. Pads 164 and 165 carried by the support and the fork respectively are designed to receive the impact. This impact ensures that food, which might otherwise stick in the tray is smartly ejected. The high point 203 of cam 191 which actuates the tray empty release cam 193 is timed to follow the dumping of the food out of the trays.

As the high point 203 of cam 191 moves the cam follower 192, the arm 193 pivoted at 195 and carrying at its opposite end the cam track 198 (see FIG. 15) engages the tray stop 157. Tray stop 157 is arranged so as to move with arms 151. Stop 157, pivoted at 200, carries a cam follower 199 which engages and is actuated by the cam 198. Release of the stop 157 is seen by reference to FIG. 16 wherein the cam 198 has pivoted the stop 157 out of the path which the tray follows in channel 150 permitting the empty tray to drop. The empty tray may be directed from chute 167 into a collector (not shown). The stop 157 is suitably pivoted at 159 on a bracket 158 (see FIG. 12) which, as noted hereinabove is carried by the movable fork assembly 40. As the tray slides down the empty tray chute 167, it is preferably arranged to control a sensor 166 (see FIG. 12) to provide an interlock signal to indicate that the dumper fork is empty and ready to accept another tray.

The arms of the fork assembly are suitably joined by a fork tie bar 153. Contiguous thereto is attached also a food deflector plate 156 which assures that food emptied from the tray flows into the chute 168 and minimizes the probability of spillage. If desired, the chute 168 may be provided with additional deflector element 170 (see FIG. 10) which further assures that the food is properly directed into the cooking machine compartment. Element 170, as the food impacts against it, may also serve to separate adhering parts of frozen food to assure better cooking. Food cooked in the machine 34 is automatically dispensed after appropriate cooking time and deposited into a container or boat 234 which is presented and suitably positioned to receive the food therein.

The mechanism for dispensing the boat will now be described. Reference for that reason is made to FIGS. 17–24. Food which has been introduced into the cooking machine 34 through the opening 254, after cooking, is dispensed through the chute 255 and delivered at a receiving station 256 into a waiting container or boat 234 which is held in position on conveyor 252 by a gate arrangement 257 (see FIG. 17). The dispenser 36 comprises a self contained unit which is electrically interconnected with the cooking apparatus and is suitably positioned contiguous to the conveyor 252 in a suitable manner such as on brackets 253. It will be understood, however, the conveyor and mounting brackets arrangement is readily susceptible of modification to suit various arrangements for using containers delivered by the boat dispensing arrangement.

The dispenser 36 includes a frame 231 which comprises a horizontal plate 250 surmounted by a boat stacking chute 233 which is adapted to retain a supply stack 232 of containers preferably of the single use paper kind which nest closely, although it will be apparent that plastic containers may also be employed. Preferably the chute 233 is ararnged so that it is contoured in a manner such that the weight of the stacked boats is suitably distributed on the surface 245 rather than directly on the lowermost container. A back-up structure 246 lends structural strength to sustain the surface 245. The supply of nested containers 234 is held in alignment on the plate 245 by a front guide 247. Side support tracks 235 function to hold the supply laterally and to guide a weight 240 along the contoured path assuring positive uniform delivery to the escapement of each boat (to the last) of the supply stack. As the level of the boats diminishes, the weight 240 proceeds into recess 241 formed in the track 235. Track 235 is suitably spaced from support surface 245 and held by the standoffs 236. At the upper end of track 235 a weight storage station 242 may be conventiently formed to retain the weight 240 while the container supply is being replenished. The boat dispenser it will be noted is advantageously constructed so that is may easily be replenished without interrupting or interfering with the operation thereof. The standoffs 236 are suitably secured on shafts 238 by collar 237. The standoffs 236 holding lateral tracks 235 are arranged to be adjustable i.e. to spread to receive varying sizes of boats.

The supply of boats at the bottom of the stack is supported along opposite edges of the lowermost boat, on one side on the ledge 343 and on the other on the bearing plate 334 which, as shown, is preferably disposed so as to hold the lowermost boat 234 at a slightly lower elevation than the edge reposing on ledge 343. Mounted on the bearing plate 334 for reciprocal movement upon actuation is a blade 333 (see FIG. 20) which at its tip 341 functions to strip off the edge of the boat 234 which rests on the end 342 of support 334. The boat so released from the stack may then be manipulated by vacuum grippers. The vacuum grippers 260 and 261 are illustrated in better detail in FIG. 21. Upon suitable signal, motor 292 (FIG. 18), drives shaft 290 through coupling 291. Shaft 290 has mounted on its opposite end a crank 288 pinned at 289 for the operation of the vacuum cups 263 and 262 through the intermediary of connecting bar 278.

Operation of the crank is best shown by reference to FIG. 21. The crank 288 fastened on one end to shaft 290 is pivotally connected on its opposite end at 286 on bearing 287 to the connecting arm 278; attached to the opposite end of the connecting arm 278 through bearing 279 is the vacuum cup support arm 275. Vacuum cups 260 and 261 are mounted on the vacuum heads 262 and 263, respectively, joined by connector nipple 264, and to the support arm 275.

Vacuum is supplied for the vacuum cups through vacuum hose 265 connected to the head 263 and 266 and thence through pipe nipple 264 to provide vacuum to the second head 262. It will be apparent that while two heads 262 and 263 are employed, depending on need or desire, one, or more than two, may also be employed.

Mounted to the opposite end of the vacuum cup support arm 275 is a cam follower 281 which functions to guide the arm 275. Cam follower 281 is arranged to traverse the cam track 282 formed in the cam plate 276. Inversion of the vacuum cups is effected as cam crank 277 traverses groove 284 (see FIG. 21), i.e. thus movement produces an about face of the vacuum cups as they move from the upper boat gripping position to the lower boat release position. It is seen thus that as the cam follower 281 traverses track 282, the vacuum cups 260, 261 are inverted by the pivoting of cammed crank 277 about fixed pivot point 283. The cam cranks 277 is clamped at 274 to the vacuum cup support arm 275.

Also mounted to the shaft at 290 is the escapement cam 300. Rotation of cam 300 functions to deliver a boat individually by actuating the escapement blade 333. Rotation of the crank 300 carries the escapement notch at 301 into alignment with point 304 of the pawl 302 (see FIG. 25). The pawl 302 pivoted at 303 is pivotally connected at its opposite end at 307 with a connecting rod 306. Rod 306 comprises suitable connectors 314 and 315. The pawl 302 is held against the surface of the cam 300 by means of a tension spring 318 connected thereto at 319, and at its opposite end 320, on the plate 250. The tension on spring 318 causes the point 304 of pawl 302 to enter notch 301 of cam 300. The effect of movement of pawl 302 actuated by the cam 300 is best shown in FIG. 24. As rod 306, which is pivotally attached to the bell crank 309 at point 308, is moved by the action of crank 300 and pawl 302, it imparts oscillating motion through pivot 310 to the connecting bars 312 and 324. As a consequence, cam links 320 and 321 pivoted respectively at one end at 322 and 323 and at the other end at 329 and 330 by pins 327 and 328 move the eccentric cams 325 and 326 respectively.

The eccentric cams 325 and 326 rotating in a suitable seat of the escapement blade 333 allow the blade to retract momentarily as the pawl end 304 engages in notch 301 thereby causing the end 341 of blade 333 to withdraw behind the leading edge of boat guide 339 permitting one edge of the lowest boat to drop onto ledge 342 of bearing plate 334 while still being retained on the opposite edge of ledge 343. This motion of the escapement blade 333 is shown in better detail in FIGS. 19 and 20.

Movement of the escapement blade 333 pushes the edge of the lowest boat off the bearing plate 334 and allows the boat to pivot clockwise about the upper surface 344 (see FIG. 20) of support ledge 343.

As the lowermost boat is pushed off ledge 342 by escapement lip 341 it is readily stripped from the stack by the vacuum cups. The remaining boats continue to be supported by ledge 342 and 341. After the vacuum head arrangement carrying the boat is inverted, the vacuum is terminated and the boat is released and (as shown in FIG. 19) carried right side up on conveyor 252. The vacuum cups are commercially available and preferably are of a kind provided with bellows grippers as described in U.S. Patent No. 2,798,757 which affords the necessary sidewise flexibility to allow the boat in the process of being dispensed to clear the escapement arrangement i.e. move away from the point 344.

Vacuum to the cups 260 and 261 is through a rotary valve as shown in better detail in FIGS. 22 and 23. The body of valve 268 is suitably secured to the shaft 290 as by means of a set screw 348. The valve is designed so that at an appropriate point of time in its rotation, vacuum is provided to the cups 260 and 261 for gripping a boat. Also, the valve allows venting to the atmosphere so that the grip by vacuum on boat 234 is released allowing the boat to deposit on the belt 252. The valve seat 349 which is held against the valve body 268 through two springs 355 has a pair of slots 350 and 351 connected with pipe nipples 272. Slots 352 and 353 in valve body 268 serve to connect the passages or grooves 350 and 351 in the valve seat to provide vacuum from the source connected at 269 through pipe nipple 271 (FIG. 21). The groove 350 in the valve seat 349 is connected to the vacuum cups through pipe nipple 273 and flexible tubing 265. At an appropriate time during the cycle, a vent port 354 opens and breaks the vacuum to the vacuum cups thereby permitting atmospheric pressure to enter the vacuum line 265 whereupon the vacuum grip on the boat 234 is released.

Figure 18:
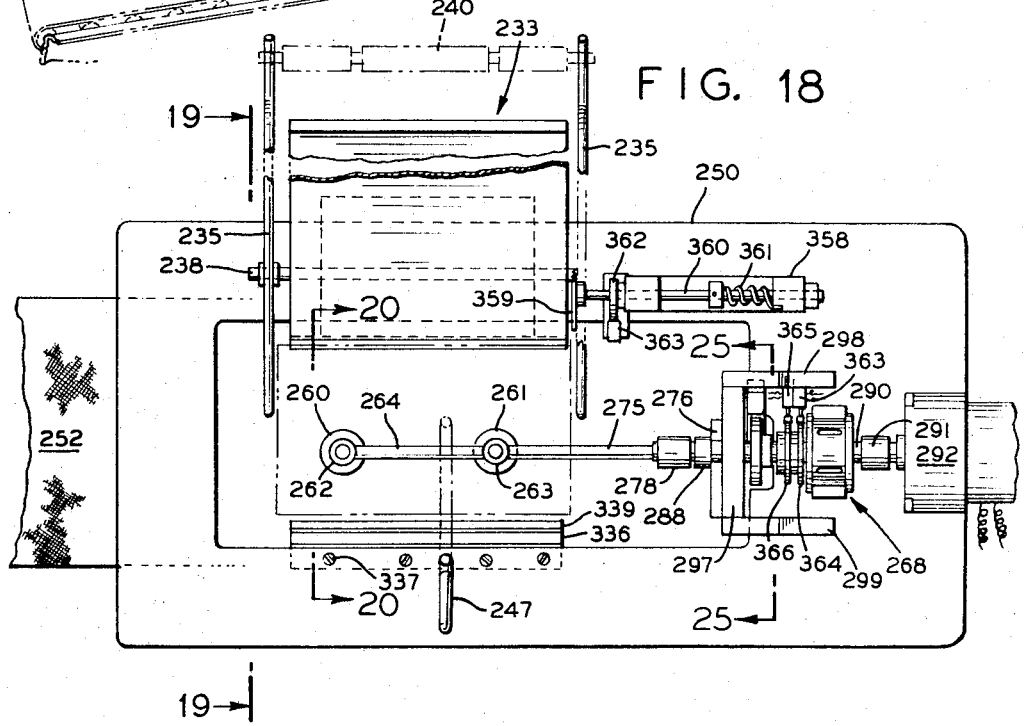
FIG. 18 is a plan view of the boat dispenser and drive means.

Depicted in FIG. 18 is a boat supply sensing arrangement which comprises a support 358 through which projects a sensing element 359. This device is designed to signal the low level of boats permitting timely replenishment thereof when the supply falls below a predetermined number. The arrangement has the advantage of signalling a low level thereby permitting replenishment during use without interruption of operation of the machine.

In the sensor, element 359 is loaded by spring 361 under torsion while in contact with boat stack 232. When the supply of boats is below the level of contact with the sensor, the sensor 359, rigidly mounted to a shaft 360, pivots and signals the absence of boats in contact with sensing head 359. When the supply is replenished the sensor 359 radially loads torsion spring 361 which is fastened on one end to the shaft 360 and on the other end to the boat sensor support 358. Rotational movement imparted to 359 causes a cam 362 to trip or to contact a switch 363 which then triggers an appropriate signal for the reloading of the boat dispenser.

Figure 17:
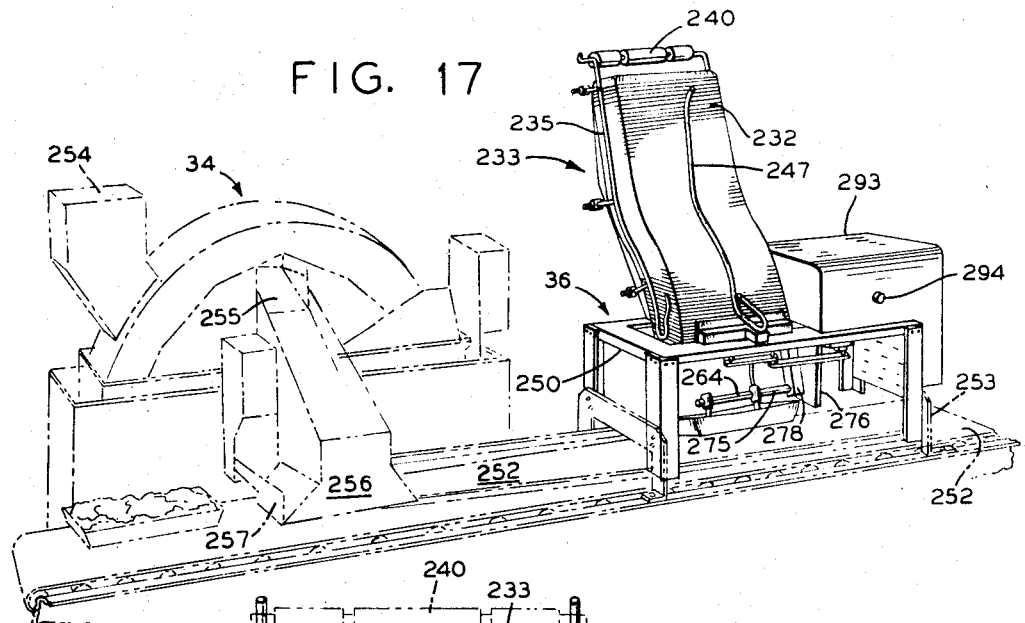
FIG. 17 is a perspective view of the boat dispenser (holding the stacked one-use serving receptacles) installed over a conveyor in a manner to provide a receptacle for the food dispensed from the cooking apparatus.

Referring to FIG. 18 switch 363 at appropriate time in the cycle provides a signal to actuate the gate 257 thereby releasing the boat previously filled with food discharged from cooking mechanism 34 (see FIG. 17). Switch sensor 363 is actuated by means of a cam 364. Switch 365 actuated by cam 366 is employed to signal the end of a complete cycle of the boat dispenser.

The functioning and advantageous features of the apparatus will be further apparent by a reference to the wiring diagram of FIG. 26 and the description in connection therewith.

FIG. 26 of the drawing illustrates a basic electrical system which may readily be implemented by one skilled in the art to render the foregoing arrangement operable. Circuit protective devices (not shown) may be presumed to be included in accordance with standard procedures and regulations. Illustrated in the drawing is the fundamental logic only. Heater wiring for the cooking apparatus and temperature maintaining over-temperature thermostats of standard commercially available kind are not shown. It will be apparent, also that instead of electric heating elements for the cooking machine a gas-fired system may optionally be employed.

Referring now to the dawing which is of the one-line diagrammatic variety, electrical power is connected to the "power in" connection as shown at 367. The order sequencer 368 may optionally be a conventional stepping switch arranged so that regardless of the number of orders commanded of the food preparing machine, the machine will optionally and sequentially process one order at a time in sequence any of the stored items such as is designated by dispensers 369, 370, 371, and 372. Although there are four discrete dispensers shown, this is in no way meant to limit the number of dispensers which can be employed. The dispensers as noted in the foregoing description may optionally be refrigerated and may comprise internal conveyor systems which on command from the order sequencer, will deliver one order at a time to the collector conveyor. It is obvious that a system of internal conveyors, to make use of as much of the entire cubical contents of the dispenser, will have to be suitably interlocked. For instance, a number of horizontal shelves arranged in a vertical array must be so connected that the individual horizontal shelves will be successively unloaded before the next horizontal shelf is placed in the dispensing position. Additionally, and should the dispensers be refrigerated, it is desirable to open and subsequently close a door in the course of delivering one ordered item to the collector conveyor drive. Further interlocking is required to assure that the collector conveyor drive will not handle more than one ordered item at a time. This means that only one dispenser may deliver an item at any one time.

The drive 373 for collector conveyor 37 is arranged to operate in this particular embodiment on signal from any one of the dispensers 369–372 which has delivered an order to the collector conveyor system. This presumes that the dispenser switches 374, 375, 376, and 377 for the dispensers respectively (shown normally open) close only after an ordered item has been positioned on the collector conveyor. The collector conveyor drive upon a closure of the appropriate dispenser switch will deliver an uncooked food portion to the fryer loader drive 378.

The fryer loader drive 378 is arranged to take the uncooked food item and place the uncooked food into the fryer. This will occur when the two normally opened switches 379 and 380 have been closed. The normally open switch 380 shown as the tray sensor will close when the tray has been properly seated. The compartment position sensor switch 379 on the fryer will close when a compartment on the fryer is positioned and waiting to receive the uncooked portion of food. The basic circuitry required to effect this operation insofar as the fryer is concerned may comprise a motor drive which is operable to index the fryer wheel. Such a drive will sense the position for loading the fryer, at which point the drive will stop and the duration of the dwell in the stop position can be implemented by a time delay relay. After the time delay relay has timed out, the drive will cause the next fryer compartment to be positioned at the "load" position.

When the tray which held the uncooked food portion has been emptied, it is discharged past a sensor into a storage receptacle. The ordering circuit is inhibited from releasing a subsequent order until this sensor indicates that the previous tray has been discharged.

After the food has been cooked in the fryer, the processing wheel will deliver the "now cooked" food to the exit chute. The food then may be delivered by gravity to a waiting paper container or paper boat loaded at the fryer exit chute.

The cooked food exit chute sensor switch 381 when actuated will close, energizing a timed switch 383 and the paper boat dispenser drive 382. The paper boat dispenser drive 382 will begin by selecting a single paper boat from a supply thereof and thence deliver it to a suitable arranged conveyor. This conveyor carries the paper boat to the fryer exit chute station. The timed switch, which may conveniently be actuated by the paper boat dispenser drive means, is employed so that it (after a selected period of time) will energize a solenoid gate 384 which maintains the previous paper boat at the fryer exit chute station. The time delay is desirable to assure that all of the cooked food has been ejected from the fryer and into the paper boat. When the timed switch 383 activates its normally opened switch 385, it thereby energizes the solenoid gate. This will result in the filled boat leaving that station to be optionally conveyed to the order assembly station. Shortly thereafter, the timed switch 385 will re-open de-energizing the solenoid gate 384 which now will act as a stop and retain the subsequent paper boat at the fryer exit chute station.

It will be apparent to those skilled in the art that various modifications may be made to the concept herein provided without departing from the invention. Accordingly, the scope of the invention is not to be limited except insofar as necessitated by the appended claims.

We claim:

1. A container dispensing unit comprising a frame, a boat containing storage chute mounted on said frame arranged to hold a nested stack of inverted containers, a pair of stationary ledges mounted at the base of such chute and supporting the lowermost container at the opposite sides of its top rim, a reciprocating blade extending substantially the length of the container support portion of one of said stationary ledges positioned on one of said ledges, said blade being reciprocated on command so as to displace one edge of the lowermost containers of the stack from its supporting position on the ledge below said blade, a vacuum cup arranged to grasp the lowermost inverted container of the nested stack which is resting on said ledges to invert said container and to deliver same right side up after said blade has displaced the edge of the lowermost container from the supporting ledge, means to reciprocate said blade, and means to provide vacuum to said vacuum cup and to vent said vacuum as said container is turned right side up by said vacuum cup.

2. The apparatus of claim 1 wherein said boat chute is provided with side rails wherein said rails are adapted to guide a weight which aids positive feed of said boats and which retains said weight on the rail as the weight reaches its lowermost position.

3. The apparatus of claim 1 provided with a boat supply detection sensor which contacts the nested supply of boats contiguous to said ledges and signals the presence or absence of boats.

4. The apparatus of claim 1 in combination with a cooking apparatus which is arranged to dispense individual portions of cooked food and wherein said dispensed container is brought in position contiguous to said cooking apparatus and temporarily retained until a portion is dispensed therein and electric connection between said cooking apparatus and container dispenser to prevent the dispensing of a subsequent container until after a prior dispensed and filled container is released from the fill position contiguous to said cooking apparatus.

5. The apparatus of claim 1 in combination with an automatic food preparing and dispensing system including an order signal generating and signal storing means and food preparing and dispensing apparatus responsive to said signal means for preparing and dispensing food into individual containers for serving to customers.

References Cited

UNITED STATES PATENTS

| | | | |
|---|---|---|---|
| 2,954,900 | 10/1960 | Brubaker | 221—211 |
| 3,214,058 | 10/1965 | Sergio | 221—6 |
| 3,275,189 | 9/1966 | Goldsborough et al. | 221—36 |

BILLY J. WILHITE, *Primary Examiner.*